(12) United States Patent
Despain

(10) Patent No.: US 10,883,568 B1
(45) Date of Patent: Jan. 5, 2021

(54) SHEET-SECURING DEVICE

(71) Applicant: Richard Riego Despain, Sandy, UT (US)

(72) Inventor: Richard Riego Despain, Sandy, UT (US)

( * ) Notice: Subject to any disclaimer, the term of this patent is extended or adjusted under 35 U.S.C. 154(b) by 0 days.

(21) Appl. No.: 16/984,711

(22) Filed: Aug. 4, 2020

Related U.S. Application Data

(60) Provisional application No. 62/883,416, filed on Aug. 6, 2019.

(51) Int. Cl.
*F16G 11/00* (2006.01)

(52) U.S. Cl.
CPC .................. *F16G 11/00* (2013.01)

(58) Field of Classification Search
CPC .... Y10T 24/44034; Y10T 24/23; F16G 11/00; E04H 15/64; A47C 21/022
See application file for complete search history.

(56) References Cited

U.S. PATENT DOCUMENTS

| | | | | |
|---|---|---|---|---|
| 761,956 A * | 6/1904 | Gorton | ................ | A41F 11/02 24/519 |
| 897,911 A * | 9/1908 | Lorentz | ................ | A41F 11/02 24/519 |
| 1,265,243 A * | 5/1918 | Parker | ................ | F16B 5/0692 24/459 |
| 1,426,636 A * | 8/1922 | Hawie | ................ | A41F 11/02 24/464 |
| 2,939,195 A | 6/1960 | Carlson | | |
| 4,660,240 A * | 4/1987 | Hutton | ................ | A47C 21/022 24/300 |
| 4,688,304 A * | 8/1987 | Marcott | ................ | A47K 10/12 135/119 |
| 5,033,170 A * | 7/1991 | Ewert | ................ | A41F 1/00 24/459 |
| 5,046,222 A | 9/1991 | Byers et al. | | |
| 5,117,537 A * | 6/1992 | Hunter | ................ | A47C 21/022 24/455 |
| 5,168,605 A * | 12/1992 | Bartlett | ................ | A47C 21/022 24/129 R |
| 5,918,614 A * | 7/1999 | Lynch | ................ | E04H 15/18 135/114 |
| 6,108,837 A * | 8/2000 | Knebel, III | ................ | A47C 21/022 24/457 |
| D445,625 S * | 7/2001 | Smith | ................ | D6/607 |
| 7,784,158 B2 | 8/2010 | Doyle | | |
| 8,650,725 B1 * | 2/2014 | Cooper | ................ | E04H 15/64 24/459 |
| D748,461 S * | 2/2016 | Catchings | ................ | D8/394 |

* cited by examiner

*Primary Examiner* — Robert Sandy
*Assistant Examiner* — Louis A Mercado
(74) *Attorney, Agent, or Firm* — Workman Nydegger

(57) ABSTRACT

A sheet-securing device through which a sheet is attached to a cable. The sheet-securing device includes a frame; a stopper; and a locking element interacting with the frame to secure the sheet in a locked state between the stopper and the frame of the sheet-securing device.

20 Claims, 5 Drawing Sheets

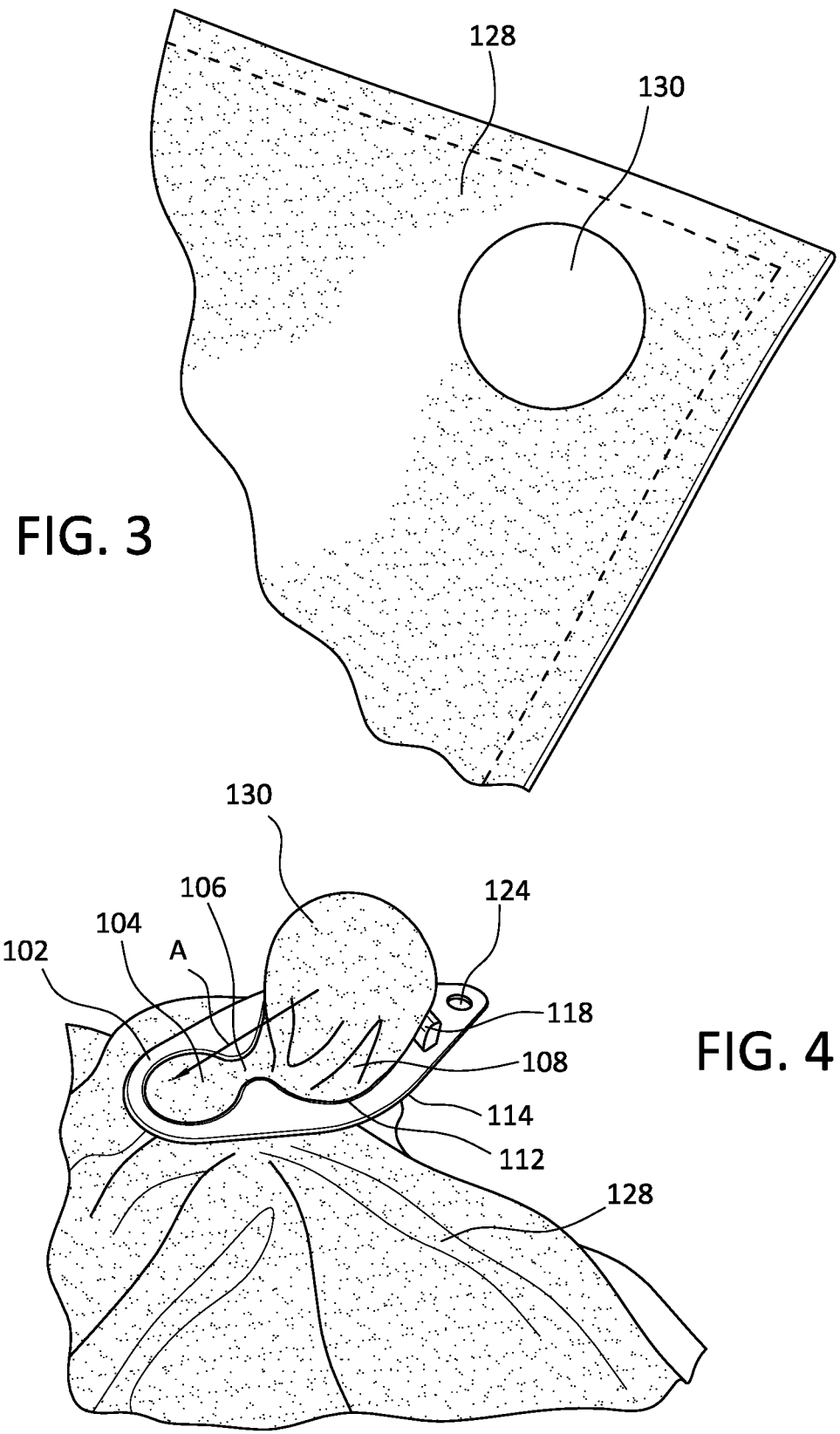

SHEET-SECURING DEVICE

FIELD OF THE DISCLOSURE

This disclosure relates to a sheet-securing device used for attaching a cable to a sheet of material without puncturing or permanently damaging the sheet.

BACKGROUND

Securing a sheet of material, such as a tarp, to a cable can be challenging because it is difficult to attach a cable to a sheet. One common way to attach a cable to a sheet is to use a grommet. With tarps, for example, a grommet system includes multiple predetermined holes along the edge of the tarp where a metal ring or grommet reinforces each hole. The grommets serve as an accessory opening through which a cable can be passed and attach to the sheet. When the cable is tensioned, the grommet supports the hole in the fabric, so the hole does not rip or tear under the tensioning force. The tensioned cable can then be secured or tied down to maintain the sheet in place, often in a stretched position.

Grommets in a sheet of material, however, are not always in a location needed or ideal. If a grommet is not installed in a location desired on the sheet, a solution may be to install a grommet in the desired location simply. Installing grommets, however, is troublesome, timely, and would require puncturing another permanent hole in the sheet. If the additionally installed grommet were no longer needed, the hole in the sheet would remain serving no purpose.

Existing attempts to provide adjustable sheet-securing devices include a frame and a stopper where friction is created between the stopper and the frame to secure the sheet in place. This design is an improvement over the grommet system as it allows for a cable to be secured to the sheet of material in a location of choice without requiring the creation of additional holes in the fabric.

These existing devices, however, often require tension on the device to maintain the friction to secure the sheet between the stopper and the frame. In these devices, if the tensioning force is decreased, the friction force is also decreased, reducing the ability of the device to secure the sheet. If these devices do not have a tensioning force, the friction force is also non-existent, and the sheet is no longer secured to the device. With other sheet-securing devices, as the tension on the sheet increases, eventually, the tensioning force overcomes the friction force, and the sheet becomes detached from the sheet-securing device.

Existing sheet-securing devices lack a mechanism that locks the sheet against the frame and are limited in the amount of tensioning force that can be applied. Without a locking mechanism, the sheet in these devices is not secured to the frame, and the device will prove faulty and unreliable. There is a need for a sheet-securing device that addresses the problem of existing devices inadequately securing sheets to cables.

SUMMARY

Embodiments of a sheet-securing device, according to the disclosure, overcome the problems associated with existing devices that secure a cable to a sheet of material. These embodiments overcome the problems and insufficiencies in the art by using a locking element to lock the sheet to the frame and prevent disengagement between the sheet and the sheet-securing device. The ability to lock the sheet to the sheet-securing device does not rely on a tensioning force or friction, which is a problematic limitation of many existing sheet-securing devices.

In an embodiment, the sheet-securing device comprises a frame defining an inner periphery which defines first and second apertures separated by a clearance. The first aperture may be larger than the second aperture. A stopper may be arranged to engage a sheet and the frame by extending or passing through the larger first aperture of the frame with a portion of the sheet at least partially wrapping or extending about the stopper. The stopper and portion of the sheet extending therearound may be passed from the larger first aperture through the clearance to the smaller second aperture, which may be sized, so the stopper is too large or otherwise unable to pass through the second aperture. The locking element may then engage the frame to prevent the stopper and portion of the sheet extending therearound from passing back through the clearance to the larger first aperture.

The locking mechanism can be a variety of elements, which can secure the sheet in place by ensuring that the sheet remains engaged about the frame in a locked position. Embodiments of the present disclosure also include the ability to fasten a cable to the sheet-securing device to facilitate or complete the securing of the sheet. This can be accomplished by including a way or structure for the cable to interact with the frame, so the cable is also engaged in a locked position. The present disclosure can also include tabs that extend from the frame that can be used for gripping the sheet-securing device to apply tension to the sheet or to manipulate the sheet-securing device.

The present disclosure offers the solution of fastening a sheet to a cable without damaging the sheet and with an improved connection relative to existing sheet-securing devices. It will now be described in greater detail below.

BRIEF DESCRIPTION OF DRAWINGS

FIG. 3 is a perspective view of a stopper to the sheet-securing device and a sheet.

FIG. 4 is a perspective view showing how the sheet and stopper of FIG. 3 are passed through a first aperture and urged towards a second aperture.

DETAILED DESCRIPTION

Figure 1:
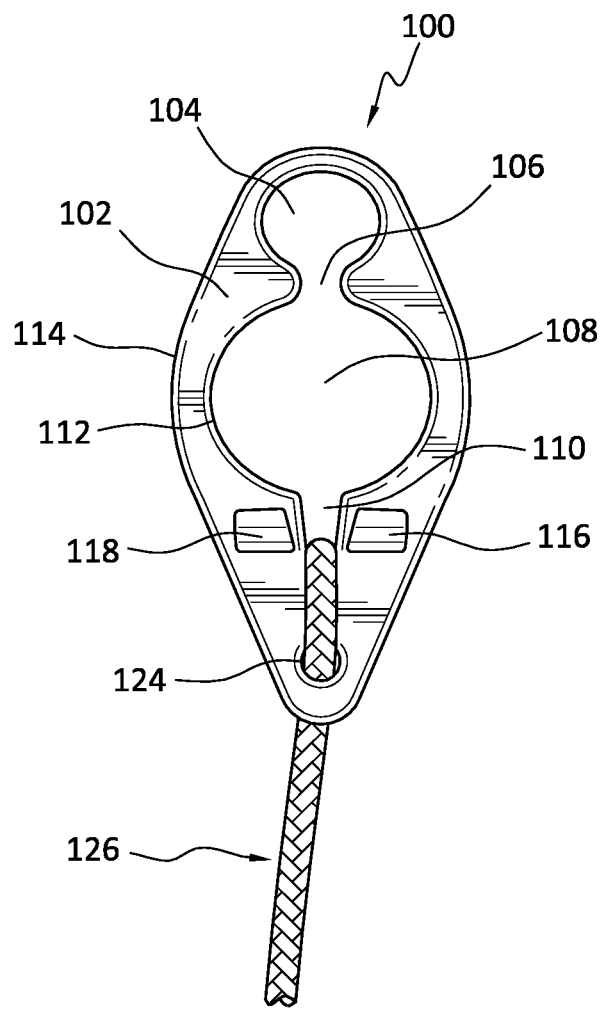
FIG. 1 is a perspective view of a frame of a sheet-securing device with a cable attached thereto.

A better understanding of different embodiments of the disclosure may be had from the following description read with the drawings in which like reference characters refer to like elements.

While the disclosure is susceptible to various modifications and alternative constructions, certain illustrative embodiments are shown in the drawings and are described below. It should be understood, however, there is no intention to limit the disclosure to the specific embodiments disclosed, but on the contrary, the intention is to cover all modifications, alternative constructions, combinations, and equivalents falling within the spirit and scope of the disclosure.

Numerical qualifiers (i.e., first, second, etc.) are used in the following discussion merely for explanatory purposes. They are not intended to limit their location or the segments or components of the embodiments.

Referring to the drawings, FIG. 1 is a perspective view of an exemplary embodiment of a frame 102 of a sheet-securing device 100 with a cable 126 attached to it. The frame 102 can be formed out of a variety of materials, including plastic, metal, wood, or a combination of materials. The frame 102 can be rigid or semi-rigid to maintain its shape when experiencing a tensioning force and/or to support attachments as described herein. Although the frame 102 is thin and conserves space, it may do so without sacrificing the strength to withstand a tensioning force equivalent to tensioning a sheet such as a tarp, a cover, or the like.

The frame 102 can withstand stronger forces by increasing the integrity and strength of the frame 102 and can be done in a variety of ways including using different materials, changing the dimensions of the frame 102, changing the shape of the frame 102, or any other techniques readily apparent to one with ordinary skill in the art. This embodiment shows the frame 102 as resembling a diamond shape. However, the frame 102 can be formed to resemble other shapes, such as a square, rectangle, oval, circle, or any other shape.

Continuing with the embodiment of FIG. 1, the frame 102 comprises an outer periphery 114 defining the outer edge of the frame 102 and an inner periphery 112 defining the inner edge of the frame 102. The inner periphery 112 and outer periphery 114 can include a rounded or beveled edge to prevent cutting or to damage a cable, sheet, or hand. The inner periphery 112 can form a first aperture 108 and a second aperture 104 and a clearance 106 connecting the first aperture 108 and the second aperture 104. The width of the clearance 106 is less than the diameter of either the first aperture 108 and the second aperture 104. In this embodiment, the second aperture 104 is smaller than the first aperture 108, but another embodiment may have the first aperture 108 smaller than the second aperture 104.

The embodiment of FIG. 1 shows how a cable 126 may be secured to a frame 102 of a sheet-securing device 100. The cable 126 can include a rope, strap, cordage, line, string, strand, thread, or any other similarly elongated object. The inner periphery 112 of the frame 102 also outlines a constricting aperture 110 which narrows as it extends towards the outer periphery 114 of the frame 102 and can be of varying sizes to allow for the passing and securing of various sizes of cables 126.

To secure a cable 126 to the frame 102, the cable 126 is passed up and through the constricting aperture 110 and then brought back down through an accessory opening 124. The accessory opening 124 is located between the constricting aperture 110 and the outer periphery 114. Still, it can be in other positions of the frame 102 to assist in the securing of a cable 126. The constricting aperture 110 may define a profile from a more sizable portion tapering toward a narrower portion as it approaches the outer periphery 114.

As the cable 126 is passed through the more significant portion of the constricting aperture 110 and then directed through the accessory opening 124, the cable 126 may be cinched toward the narrower portion of the constricting aperture 110, arresting sliding translation of the cable 126 and locking the cable 126 in place relative to the frame 102. The accessory opening 124 can also be of varying sizes to allow for the passing and securing of various sizes of a cable 126. Securing the cable 126 to the frame 102 will prove convenient as the frame 102 can also secure a sheet to the sheet-securing device 100, the sheet-securing device 100 serving as a securing interface between the cable 126 and the sheet 128, as discussed below.

In the embodiment of FIG. 1, two gripping tabs 116, 118 can be seen and serve to grip and manipulate the sheet-securing device 100. This is beneficial as the sheet-securing device 100 will sometimes need to be pulled or tensioned to be adjusted and gripping a flat device can be difficult. The gripping tabs 116, 118 can vary in length and angle of the protrusion. In this embodiment, the gripping tabs 116, 118 are orthogonal to the frame 102. Additionally, the frame 102 can have more tabs or fewer tabs and can be in various locations about the frame 102.

In this exemplary embodiment, the frame 102, first aperture 108, second aperture 104, clearance 106, constricting aperture 110, inner periphery 112, outer periphery 114, accessory opening 124, and gripping tabs 116, 118 are all included as a monolithic sheet-securing device 100. However, other embodiments may include different attachments that accomplish the same purpose as the listed elements.

Figure 2:
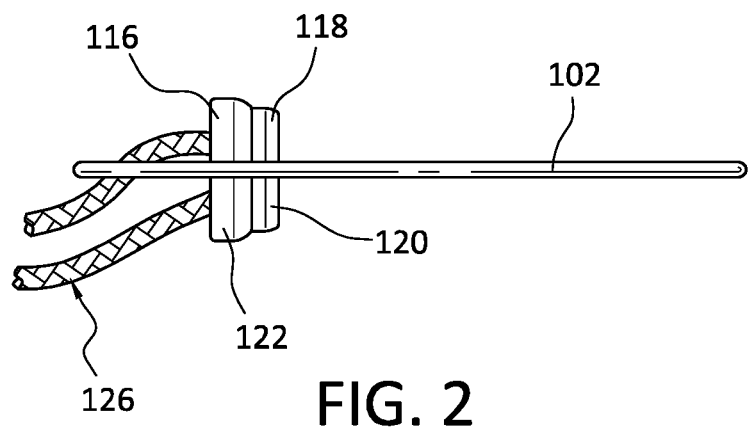
FIG. 2 is a side view of the frame in FIG. 1 with a cable attached thereto.

FIG. 2 shows a side view of the frame 102 and cable 126 of FIG. 1. In FIG. 2, four gripping tabs 116, 118, 120, 122 are visible. One pair of gripping tabs 116, 118 is on one side of the frame 102, and the other side of the frame 102 includes another pair of gripping tabs 120, 122 that oppose the first pair of gripping tabs 116, 118. These gripping tabs 116, 118, 120, 122 allow for the secure gipping of the frame 102. This embodiment shows the cable 126 being passed through the frame 102 of the sheet securing device 100 as described regarding FIG. 1.

FIG. 3 is a perspective view of an embodiment of a stopper 130, and a sheet 128 configured to cooperate with the frame 102 and the cable 126 of FIG. 1. The sheet 128 can be any flexible material and can include cotton, silk, polyester, wool, denim, linen, or any other sheet material. Common examples of flexible sheets where the sheet-securing device of the disclosure may be applicable may include but are not limited to, tarps or tent-related sheets, boat or car covers, or pool covers. The stopper 130 is a sphere but can be formed in the shape of a cube, cuboid, sphere, cone, cylinder, prism, pyramid shape, combinations thereof, or any other suitable configuration, and can consist of a variety of materials including plastic, wood, metal, rubber, or other material. The first and second apertures 108, 104 may define a shape or configuration corresponding to the shape of and arranged to cooperate with the stopper 130 such that the stopper 130, after engaging the sheet 128, can pass through the first aperture 108 but cannot pass through the second aperture 104.

FIG. 4 is a perspective view showing the interaction or engagement between the stopper 130 and the sheet 128 of FIG. 3 with a frame 102, according to FIGS. 1 and 2. The embodiment of FIG. 4 shows the stopper 130 placed under the sheet 128 and the stopper 130 and sheet 128 being passed upwardly through the first aperture 108 of the frame 102 so the sheet 128 and the stopper 130 cooperate to engage the frame 102. For example, the stopper 130 may be formed as a substantially spherical object around which a portion of the sheet 128 may at least partially wrap or extend as the stopper 130 and the sheet 128 are passed upwardly through the first aperture 108.

In this embodiment, the first aperture 108 is large enough for the stopper 130 and the portion of the sheet 128 wrapped or extending therearound to pass upwardly through, and the second aperture 104 is small enough to restrict the stopper 130 and sheet 128 from passing back down through the second aperture 104. The stopper 130 and sheet 128 may be urged from the first aperture 108 towards the second aperture 104 by passing the sheet 128 through the clearance 106 in a direction (A).

By providing first and second apertures 108, 104 with different sizes, the sheet-securing device 100 of the embodiment of FIG. 4 can securely retain the sheet 128 by preventing disengagement of the sheet 128 after the sheet 128 and stopper 130 is in or about the smaller second aperture 104. The insertion of the stopper 130 underneath the sheet 128 as the stopper 130 and the sheet 128 are passed upwardly through the larger first aperture 108 causes the sheet 128 to extend or wrap at least partially around the stopper 130 and prevents the sheet 128 from passing through the smaller second aperture 104 as the stopper 130 is engaged with the frame 102 about the second aperture 104. The description of the stopper 130 and the sheet 128 passing upwardly and downwardly relative to the frame 102 is merely exemplary, and the sheet-securing device 100 and components thereof may take any suitable form or configuration. They may be arranged in any suitable manner.

Figure 5A:
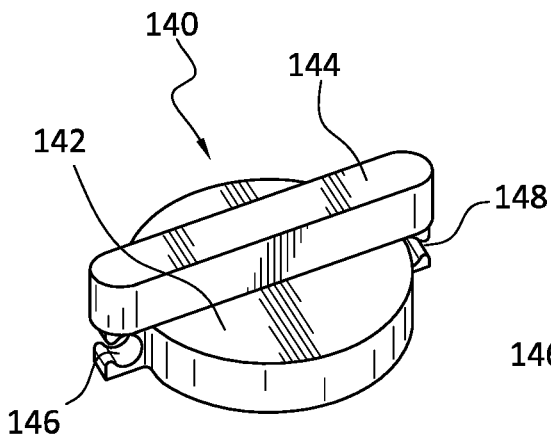
FIG. 5A is a perspective view of a locking element of the sheet-securing device.
Figure 5B:
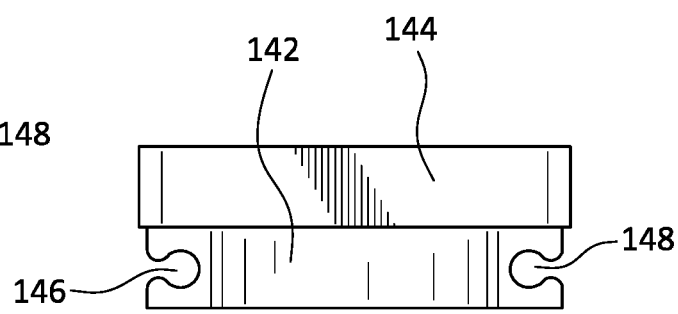
FIG. 5B is a side view of the locking element of FIG. 5A.

FIGS. 5A and 5B show a perspective view, and a side view, respectively, of an embodiment of a rotatable locking element 140 configured to cooperate with a frame 102 of a sheet-securing device 100. The locking element 140 of this embodiment includes a disc 142, a handle 144 connected to and/or above the disc 142, so it allows for gripping and twisting of the handle 144 and disc 142. The locking element 140 further comprises two parallel notches 146, 148 extending orthogonally outward from the disc 142 and configured and/or positioned to receive and slidingly cooperate with the inner periphery 112 of the frame 102. The handle 144 may include other design variations, such as different shapes and thicknesses, and the disc 142 may include additional notches or ways to secure the disc 142 with the inner periphery 112 of the frame 102.

Figure 6:
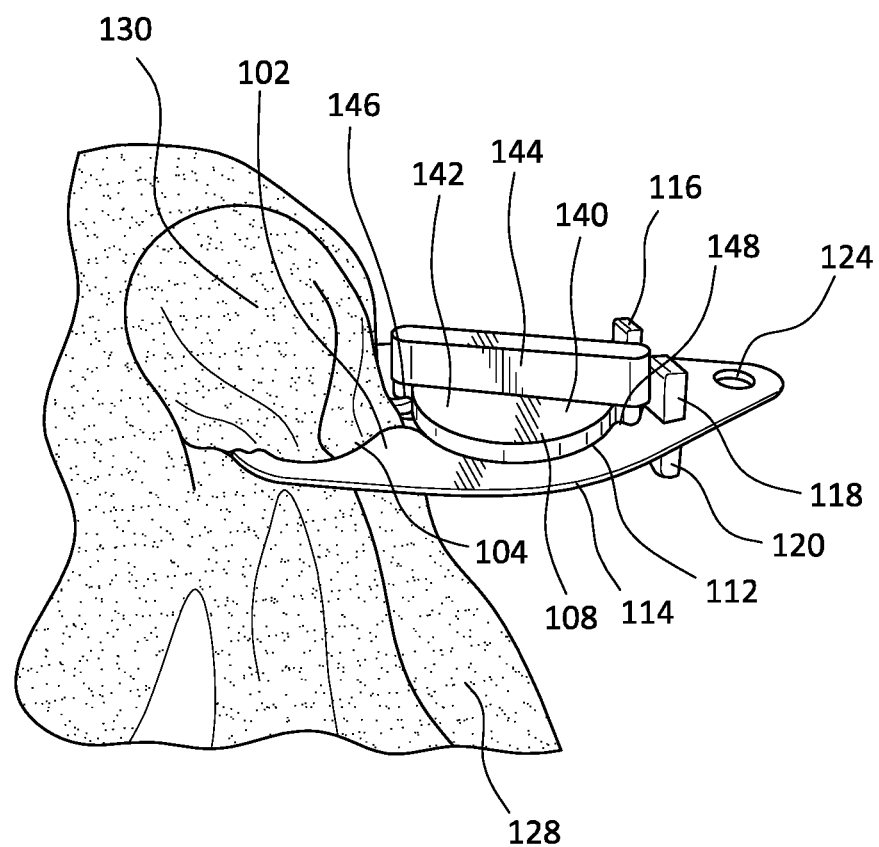
FIG. 6 is a perspective view of the locking element of FIG. 5A interacting with the sheet-securing device of FIG. 1 and the stopper and sheet of FIG. 3.

FIG. 6 is a perspective view of the locking element 140 of FIGS. 5A and 5B interacting with the frame 102, the stopper 130, and the sheet 128. The locking element 140 is arranged to secure the stopper 130 and sheet 128 from passing through the second aperture 104 to the larger first aperture 108 and disengaging from the frame 102. Here, the disc 142 is oriented above the first aperture 108, so the notches 146, 148 are aligned with the constricting aperture 110 and the clearance 106 and able to pass through the first aperture 108 to engage the locking element 140 with the frame 102.

By positioning the inner periphery 112 to cooperate with the two notches 146, 148, the locking device 140 can be locked into position by rotating the handle 144. The act of locking the locking device 140 seats or engages the two notches 146, 148 of the disc about the inner periphery 112. The locking device 140 restricts the stopper 130 and sheet 128 from passing from the second aperture 104 to the larger first aperture 108 locking the sheet 128 in position between the stopper 130 and the frame 102 and securing the sheet 128 in a stable and intuitive manner.

Figure 7:
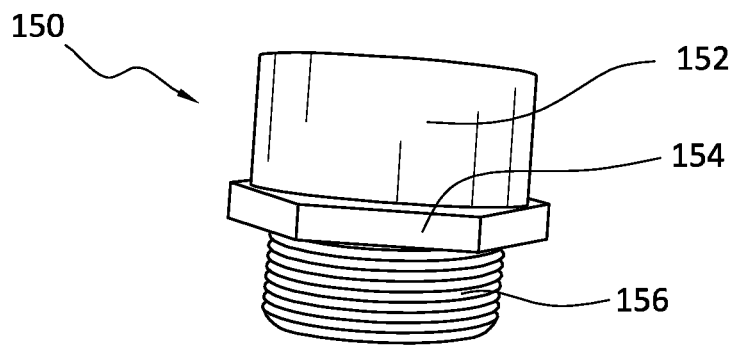
FIG. 7 is a perspective view of another embodiment of a locking element.

FIG. 7 is a perspective view of another embodiment of a locking element formed as a screw locking element 150. The screw locking element 150 includes a body 152, a handle 154 extending from the body 152 that allows for the gripping and twisting of the body 152, and a thread 156 arranged to interact with the inner periphery 112 of the frame 102.

Figure 8:
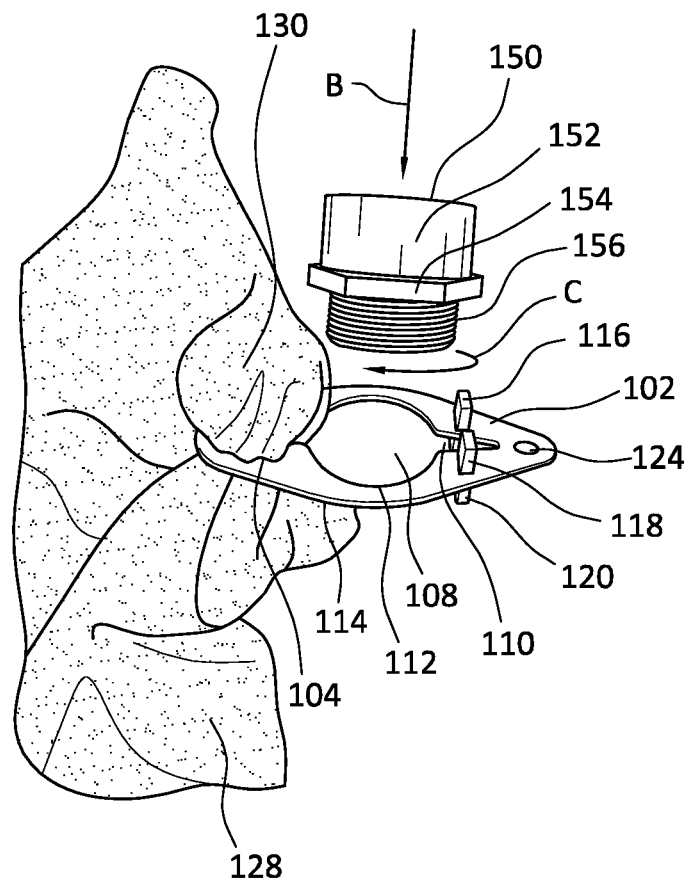
FIG. 8 is a perspective view of the locking element of FIG. 7 interacting with the sheet-securing device of FIG. 1 and the stopper and sheet of FIG. 3.

FIG. 8 is a perspective view of an embodiment of a sheet-securing device 100 comprising a screw locking element 150 introduced in FIG. 7. The screw locking element 150 interacts with the frame 102 of the sheet-securing device 100 to secure the stopper 130 and sheet 128 in a locked position about the second aperture 104. In this embodiment, the frame 102 shows the outer periphery 114 and the inner periphery 112 defining the first aperture 108, which is where the screw locking element 150 is to be positioned to interact with the frame 102. The stopper 130 and sheet 128 are urged from the first aperture 108 through the clearance 106 and positioned about the second aperture 104. The screw locking element 150 is to be inserted into and engaged with the first aperture 108 in a direction (B). The screw locking element 150 may then be twisted in a direction (C) to secure the screw locking element 150 with the frame 102 of the sheet-securing device 100.

The twisting of the screw locking element 150 engages the screw locking element 150 with the inner periphery 112, tightening the screw locking element 150 against the frame 102 and preventing disengagement of the frame 102 of the sheet-securing device 100 and the screw locking device 150 even under tension. After the screw locking element 150 is engaged with the inner periphery 112 of the frame 102, the stopper 130 and sheet 128 will be prevented from passing through the second aperture 104. Additionally, this embodiment includes tabs 116, 118, 120 extending orthogonal to the frame 102 and that allow for gripping, an accessory opening 124, and a constricting aperture 110 formed by the inner periphery 112 and able to receive a cable 126 to be used for tensioning.

Figure 9:
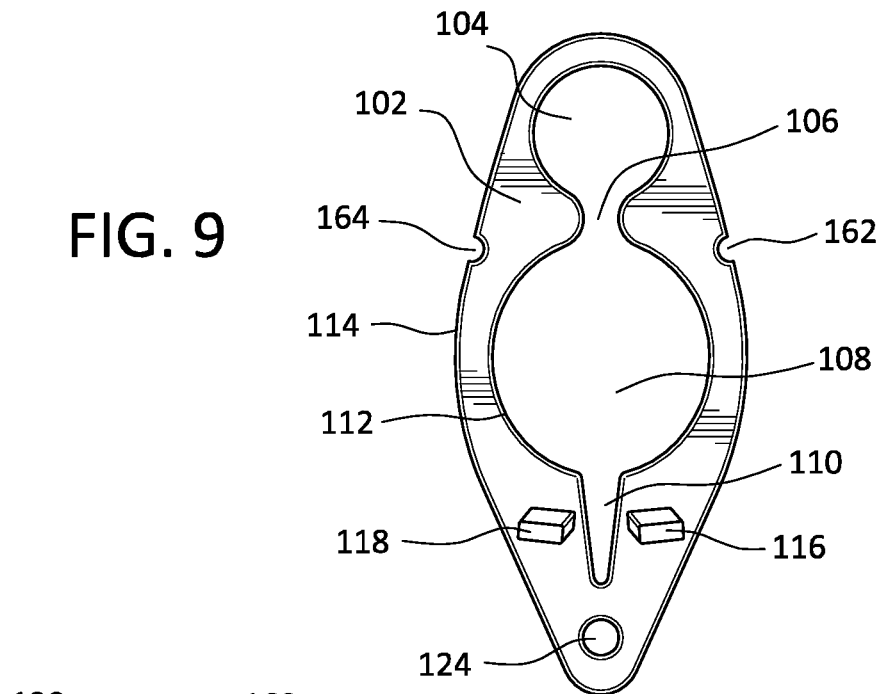
FIG. 9 is a top view of another embodiment of a frame of a sheet-securing device.

FIG. 9 shows a perspective view of another embodiment of a frame 102. In this embodiment, the outer periphery 114 of the frame 102 defines a first notch 162 and a second notch 164 through which another embodiment of a locking element such as a tie locking or cable locking element 160 may pass through to ensure that the locking element 160 remains in place relative to the frame 102.

Figure 10:
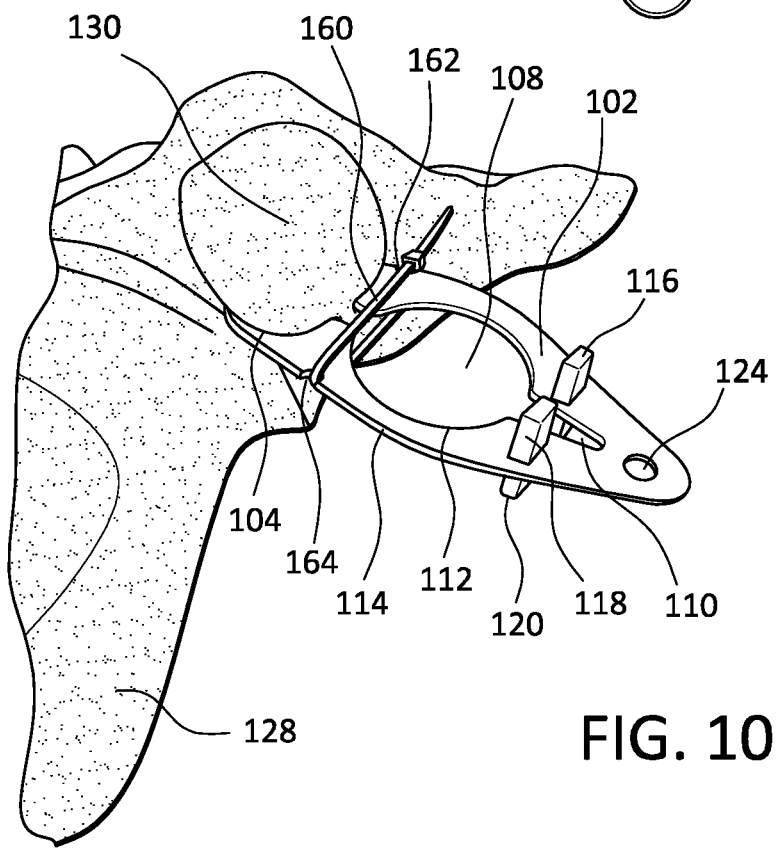
FIG. 10 is a perspective view of another embodiment of a locking element interacting with the frame of FIG. 9 and the stopper and sheet of FIG. 3.

FIG. 10 shows a perspective view of an embodiment of a sheet-securing device 100 comprising a locking element 160, as introduced in FIG. 9. The locking element 160 is configured to engage the frame 102, stopper 130 and sheet 128 to prevent disengagement between the stopper 130, the sheet 128, and the frame 102 by preventing the stopper 130 and the sheet 128 from passing from the smaller second aperture 104 to the larger first aperture 108.

In this embodiment, the frame 102 shows the outer periphery 114 and the inner periphery 112 defining the first aperture 108. The stopper 130 and sheet 128 are urged from the first aperture 108, through the clearance 106, and positioned about the second aperture 104. The locking element 160 is wrapped around the frame 102 and through the two notches 162, 164 defined by the outer periphery 114 of the frame 102. The notches 162, 164 may be located, so the locking element 160 prevents the stopper 130 and sheet 128 from passing from the second aperture 104 through the clearance 106 to the larger first aperture 108. Additionally, this embodiment includes tabs 116, 118, 120 extending orthogonal to the frame 102 that allow for gripping, and an accessory opening 124 and a constricting aperture 110 formed by the inner periphery that could receive a cable 126 to be used for tensioning.

In another embodiment, the process of securing a sheet 128 may require just the use of a single first aperture 108 and the tension from attaching a cable 126. In this embodiment, a stopper 130 is placed under a sheet 128, and the stopper 130 and the sheet 128 is passed through the first aperture of the frame 102. In this embodiment, the inner periphery 112 of the frame 102 outlines a constricting aperture 110 as described in the preceding embodiments. As the cable 126 is pulled, it provides a tensioning force on the sheet-securing device 100, which creates enough friction to hold the stopper 130 and sheet 128 securely in place about the first aperture 108.

In another embodiment, securing a sheet 128 to the sheet-securing device 100 may be accomplished without the use of a stopper 130. In this exemplary embodiment, the sheet 128 is urged through the first aperture 108. Next, the sheet 128 is urged through the clearance 106, so the sheet 128 is collected and arranged in a bunch in the second aperture 104. The sheet 128 is bunched and collected in the second aperture 104 to prevent passage from the second aperture 104 through the clearance 106 to the larger first aperture 108. After enough of the sheet 128 has been bunched and collected in the second aperture 104, the position of the sheet 128 is secured by engaging a locking element as described in the preceding embodiments with the frame 102 to prevent the sheet 128 from passage through the first aperture 108.

The present disclosure contemplates different embodiments of the locking elements. The locking element can be a rotatable locking element 140 that interacts with the frame 102 by twisting the rotatable locking element 140 to secure the rotatable locking element 140 with the frame 102. The locking element can be a screw locking element 150 that interacts with the frame 102 by twisting the screw locking element 150 to secure the screw locking element 150 with the frame 102. The locking element can be a cable locking element 160 that interacts with the frame 102 by tightening the cable locking element 160, so the cable locking element 160 wraps around the frame 102 and passes through at least one notch 162, 164 formed in the outer periphery 114 of the frame 102.

The locking element can include several embodiments not previously mentioned. In one embodiment, the locking element can include a hinged clasp that attaches to the frame 102 of the sheet-securing device 100 in which the closed position of the clasp secures the stopper 130 and the sheet 128 in a constricted and locked state about the second aperture 104. In another exemplary embodiment, the locking element includes a pin insertable into the frame 102 of the sheet-securing device 100 in which the pin secures the stopper 130 and the sheet in a constricted and locked state about the second aperture 104.

In another exemplary embodiment, the locking element includes a covering plate that wraps around the sheet-securing device 100, covering the first aperture 108. The covering plate can be secured by a clasp or pin and secures the stopper 130 and the sheet 128 in a constricted and locked state about the second aperture 104. The locking element can include a variety of embodiments that would be apparent to one with the ordinary in the art and may have any suitable configuration, shape, material, or operation.

In described embodiments of the sheet-securing device 100, the stopper 130 and the locking element are described as removable and separate pieces of the sheet-securing device 100. In other exemplary embodiments, the stopper and the locking element may be attached to the frame 102 of the sheet-securing device 100 using a cable or other attaching mechanism, so the components of the sheet-securing device 100 cannot be separated or lost.

The first aperture 108 and the second aperture 104 are not limited to the described embodiments but may have any other suitable configuration relative to the frame and relative to each other. In one embodiment, either the first aperture 108 or second aperture 104 may include an expandable joint that would allow for either a larger stopper 130 or a thicker sheet 128 to pass through either the first aperture 108, or the second aperture 104, or allow for the release of the sheet 128 and stopper 130. Additionally, in another exemplary embodiment, the first aperture 108 or the second aperture 104 may include a restricting joint that would allow for the use of a smaller stopper 130 or a thinner sheet 128. The above variations may be carried out with a single aperture.

The cable-attaching element may also include different embodiments. In one exemplary embodiment, the cable-attaching element can include a means for attaching multiple cables 126. This can be done by including a combination of multiple accessory openings 124 or multiple constricting apertures 110. Additionally, the cable-attaching element can include an embodiment that utilizes a buckle or clasping element. In another exemplary embodiment, the cable-attaching element may include a ratcheting tensioner. The cable attaching element can include a variety of embodiments and, as is like the other elements of the sheet-securing device 100, other modifications and variations will be apparent to those of ordinary skill in the art.

Embodiments of the disclosure address the problem of existing sheet-securing devices inadequately and/or inconveniently connecting sheets and cables. The embodiments of the disclosure advantageously provide a sheet-securing device that securely locks a sheet to and/or against a frame to provide an improved, intuitive, and robust connection between the sheet and a cable with minimized risk of damage to the sheet or inadvertent disengagement between the sheet and the cable.

While the preceding embodiments have been described and shown, it is understood that alternatives and modifications of these embodiments, such as those suggested by others, may be made to fall within the scope of the disclosure.

The invention claimed is:

1. A sheet-securing device arranged to connect a sheet to a cable, the sheet-securing device comprising:
   a frame comprising an inner periphery, the inner periphery defining a first aperture, a second aperture that is smaller than the first aperture, and a clearance arranged to connect the first aperture and the second aperture;
   a stopper configured to pass through the first aperture, but prevented from passing through the second aperture; and
   a locking element arranged to interact with the first aperture of the frame to prevent the stopper and the sheet from passage through the first aperture maintaining a position of the sheet between the frame and the stopper about the second aperture.

2. The sheet-securing device of claim 1, further comprising a cable-attaching element comprising a constricting aperture.

3. The sheet-securing device of claim 2, wherein the constricting aperture is formed by the inner periphery and gradually narrows in width as it extends towards an outer periphery of the sheet-securing device.

4. The sheet-securing device of claim 1, wherein the locking element is a rotatable locking element.

5. The sheet-securing device of claim 4, wherein the rotatable locking element includes a disc, a handle configured for gripping and rotating the handle and the disc, and at least one notched tab extending orthogonal to the disc arranged to receive the inner periphery of the frame.

6. The sheet-securing device of claim 5, wherein the inner periphery is arranged for the disc to pass through the inner periphery when the at least one notched tab is aligned with the clearance or a constricting aperture of the frame, and the disc is prevented from passage through the inner periphery of the frame when the at least one notched tab is not aligned with the clearance or the constricting aperture of the frame.

7. The sheet-securing device of claim 1, wherein the locking element is a screw locking element.

8. The sheet-securing device of claim 7, wherein the screw locking element further comprises a body, a handle extending from the body that is arranged for gripping and twisting the body, and a thread arranged to interlock with the inner periphery of the frame when positioned and twisted.

9. The sheet-securing device of claim 1, wherein the locking element is a tie locking element configured for wrapping around the frame.

10. The sheet-securing device of claim 9, wherein the frame is configured to have at least one notch in an outer periphery for the tie locking element to pass through as the tie locking element is wrapped around the frame.

11. The sheet-securing device of claim 1, wherein the stopper is a cube, cuboid, sphere, cone, cylinder, prism, or pyramid shape.

12. The sheet-securing device of claim 1, further comprising a first gripping tab extending from the frame and arranged for gripping.

13. The sheet-securing device of claim 12, wherein the first gripping tab extends orthogonally outward from the frame.

14. The sheet-securing device of claim 12, wherein the first gripping tab opposes a second gripping tab.

15. The sheet-securing device of claim 1, further comprising a cable-attaching element located between the inner periphery and an outer periphery of the frame configured to receive and secure a cable.

16. The sheet-securing device of claim 15, wherein the cable-attaching element comprises an accessory opening.

17. The sheet-securing device of claim 16, wherein the accessory opening is located between a constricting aperture and the outer periphery.

18. The sheet-securing device of claim 1, wherein a shape of the frame resembles a diamond shape.

19. A sheet-securing device arranged to connect a sheet to a cable, the sheet-securing device comprising:
   a frame comprising an inner periphery, the inner periphery defining a first aperture, a second aperture that is smaller than the first aperture, and a clearance arranged to connect the first aperture and the second aperture;
   a stopper configured to pass through the first aperture, but prevented from passing through the second aperture; and
   a locking element arranged to interact with the first aperture of the frame to prevent the stopper and the sheet from passage through the first aperture maintaining a position of the sheet between the frame and the stopper about the second aperture, wherein the locking element is a rotatable locking element;
   a cable-attaching element comprising a constricting aperture;
   wherein the constricting aperture is formed by the inner periphery and gradually narrows in width as it extends towards an outer periphery of the sheet-securing device;
   wherein the rotatable locking element includes a disc, a handle configured for gripping and rotating the handle and the disc, and at least one notched tab extending orthogonal to the disc arranged to receive the inner periphery of the frame.

20. A method for securing a sheet to a cable using a frame and a locking element, the frame including an inner periphery forming an inner edge of the frame and an outer periphery forming an outer edge of the frame, the inner periphery forming a first aperture, a second aperture that is smaller than the first aperture, and a clearance connecting the first aperture and the second aperture, the method comprising the steps of:
   passing the sheet through the first aperture of the frame;
   urging the sheet through the clearance;
   collecting and arranging the sheet in a bunch in the second aperture to prevent passage through the second aperture; and
   securing the sheet in the second aperture by engaging the locking element with the first aperture of the frame to prevent the sheet from passage through the first aperture to maintain a position of the sheet about the second aperture.

\* \* \* \* \*